(12) United States Patent
Gantt

(10) Patent No.: US 7,258,076 B1
(45) Date of Patent: Aug. 21, 2007

(54) CIRCULAR ANIMAL TOILET ENCLOSURE

(76) Inventor: Clarence Leroy Gantt, 850 Country Dr., Barrington, IL (US) 60010-4131

(*) Notice: Subject to any disclaimer, the term of this patent is extended or adjusted under 35 U.S.C. 154(b) by 0 days.

(21) Appl. No.: 11/668,486

(22) Filed: Jan. 30, 2007

Related U.S. Application Data

(60) Provisional application No. 60/763,489, filed on Jan. 30, 2006.

(51) Int. Cl.
*A01K 29/00* (2006.01)

(52) U.S. Cl. .................. 119/163; 119/161; 119/165; 241/46.06

(58) Field of Classification Search .............. 119/161, 119/163, 165, 166; 241/46.06
See application file for complete search history.

(56) References Cited

U.S. PATENT DOCUMENTS

| | | |
|---|---|---|
| 3,227,138 A | 1/1966 | Campbell |
| 3,734,057 A | 5/1973 | Lee et al. |
| 3,747,563 A | 7/1973 | Brockhouse |
| 3,817,213 A | 6/1974 | Chalmers |
| 3,835,812 A | 9/1974 | Edwards |
| 3,842,803 A | 10/1974 | Temel |
| 3,949,429 A | 4/1976 | Hall |
| 3,964,437 A | 6/1976 | Brown |
| 4,010,970 A | 3/1977 | Campbell |
| 4,050,415 A | 9/1977 | Conger |
| 4,117,555 A | 10/1978 | Dennis |
| 4,185,861 A | 1/1980 | Berner |
| 4,196,693 A | 4/1980 | Unversaw |
| 4,228,554 A | 10/1980 | Tumminaro |
| 4,271,544 A | 6/1981 | Hammond |
| 4,338,337 A * | 7/1982 | Frankl .................. 426/55 |
| 4,660,506 A | 4/1987 | Nalven |
| 4,729,342 A * | 3/1988 | Loctin .................. 119/163 |
| 5,458,090 A | 10/1995 | Favreau |
| 5,564,364 A | 10/1996 | Kovacs et al. |
| 5,662,066 A | 9/1997 | Reitz |
| 6,014,946 A | 1/2000 | Rymer |
| 6,039,370 A | 3/2000 | Dooley, Jr. et al. |
| 6,119,629 A * | 9/2000 | Sicchio .................. 119/162 |
| 6,176,201 B1 | 1/2001 | Fields |
| 6,453,844 B1 | 9/2002 | Janzen et al. |
| 6,457,435 B1 | 10/2002 | Bridges |
| 6,554,335 B1 | 4/2003 | Kelley et al. |

(Continued)

*Primary Examiner*—Teri Pham Luu
*Assistant Examiner*—Valentina Xavier
(74) *Attorney, Agent, or Firm*—Kirk A. Wilson

(57) ABSTRACT

The circular animal toilet enclosure of this invention has a bottom section removably coupled to a rotatable flywheel floorboard, a cover cylinder removably coupled to the bottom section, a top section removably coupled to the cover cylinder, and a controller for the enclosure. The rotatable flywheel floorboard has pivoting serrated portions for grinding excreta while the floorboard is rotating. The cover cylinder has fixed serrated portions aligned with the pivoting serrated portions for grinding excreta while said floorboard is rotating. The cover cylinder also has at least one door, and at least one shower head in fluid communication with a water supply, an upper ring, waste collection tube, and a second drive motor. The upper ring is in fluid communication with both the rotatable flywheel floorboard and the waste collection tube. The waste collection tube is in fluid communication with a sewer. The second drive motor is removably coupled to the rotatable flywheel floorboard. The enclosure is controlled by electric and electronic devices for periodically energizing an enclosure control system.

6 Claims, 4 Drawing Sheets

U.S. PATENT DOCUMENTS 6,561,131 B1 * 5/2003 Schwartz .................... 119/166
6,561,132 B2 * 5/2003 Gordon et al. .............. 119/171
6,568,348 B1 5/2003 Bedard
6,857,391 B1 * 2/2005 Gantt ......................... 119/163
2005/0028744 A1 * 2/2005 Gantt ......................... 119/163
2006/0249090 A1 * 11/2006 Ahad ......................... 119/163

* cited by examiner

CIRCULAR ANIMAL TOILET ENCLOSURE

CROSS-REFERENCE TO RELATED APPLICATIONS

This application claims the benefit of provisional patent application 60/763,489 filed on Jan. 30, 2006, the entirety of which is herein incorporated by reference. This application is also related to U.S. Pat. No. 6,857,391, issued Feb. 22, 2005.

TECHNICAL FIELD

This invention relates generally to animal toilets and more specifically to an animal waste enclosure.

BACKGROUND OF THE INVENTION

As the density of human population continues to grow in the more affluent countries, the total number of domestic pets has created an increasing problem of how to simply and safely dispose of pet excreta. Any system or product that can solve this problem must be reliable, compatible with the natural instincts of pets, not expensive to buy and operate, easy to manufacture with few moving parts to allow a reasonable manufacturer's guarantee period as well as being readily acceptable by health and police officials.

In review of the previous art in the field, the following patents were consulted:

| U.S. Pat. No. | Inventor | Date |
| --- | --- | --- |
| 3,817,213 | Chalmars | Jun. 18, 1974 |
| 3,949,429 | Hall | Apr. 13, 1976 |
| 3,964,437 | Brown | Jun. 22, 1976 |
| 4,010,970 | Campbell | May 8, 1977 |
| 4,050,415 | Knochel et al | Sep. 27, 1977 |
| 4,117,555 | Dennis | Oct. 3, 1978 |
| 4,185,861 | Berner | May 29, 1980 |
| 4,196,693 | Uversaw | Apr. 8, 1980 |
| 4,228,554 | Tumminaro | Oct. 21, 1980 |
| 4,660,506 | Nalven | Apr. 28, 1987 |
| 6,014,946 | Rymer | Jan. 18, 2000 |
| 6,039,370 | Dooley, Jr. et al | Mar. 31, 2000 |
| 6,457,435 | Bridges | Oct. 1, 2002 |
| 6,554,335 | Kelly, et al | Apr. 29, 2003 |
| 6,561,131 | Schwartz | May 13, 2003 |
| 6,568,348 | Bedard | May 27, 2003 |

The listed patents can be grouped under a few headings relative to their design and the difficulties and problems that might arise if they were in wide usage by the public.

The first grouping could be: use of the same device by both animals and humans. This is exemplified by the patents of Hall, 1976 and Rymer, 2000. These patents use a modified toilet seat that expands and contracts enough to manually arrange it as a seat for use by both humans and animals. Many humans would shy away from such use and it is very difficult to train an animal to void excreta while sitting or standing on a toilet stool seat.

The second grouping could be: use of a funnel shaped floor or platform. This is presented in patents by Brown, 1976 and by Tumminaro, 1980. The sloping floor, while stable, creates a training problem for use by any animal and in the case of Brown required that a human push a button to initiate cleaning action.

The third grouping could be: unstable floor or platform in order to initiate some mechanical action by downward movement of the floor. This is presented in patents by Knochel et al, 1977, Dennis, 1978, Unversaw, 1980, and Nalvern, weight down on a surface and it begins to move downward which would make training animals for this type of animal toilet very difficult.

The fourth grouping could be: the use of drain holes for removal of excreta in a flat stable board. This is exemplified by the patent of Bridges, 2002. Although it has the use of electronics to assist in the activation of cleaning of the flat stable board, there is no good mechanism for the cleaning of the underside of the board. It is removable to assist in this. The board also contains permanent open holes to allow the excreta to pass through. These holes are open while the animal is in the unit and constitute a hazard for harm to the legs of the animal.

The fifth group is probably not strictly an animal toilet so that it could be called: catch pouch on a pole or a pooper bag. Both Dooley, 2000, and Kelly, 2003, present this concept very well in their patents. However, this system is not automatic and requires a great deal of human intervention.

The sixth group could be entitled: the complex litter box. This concept is presented well in the patents of Schwartz, 2003, and Bedard, 2003. However, the use is limited to cats and involves special clumpable litter wherein the urine is removed as clumps of congealed litter along with fecal material by mechanical means such as rakes.

Although several patents have been issued for animal toilet inventions over many years, none have successfully solved the problem by presenting an acceptable method to the general public for rapid, simple economical disposal of dog and cat excreta. There has been no change in the handling of dog and cat excreta as compared to that of human excreta which has progressed from outdoor toilets to modern indoor toilets in bathrooms of first world people. A parallel development has been the invention of modern day washers and dryers for clothes and for dishes.

BRIEF SUMMARY OF THE INVENTION

The circular animal toilet enclosure of this invention has a bottom section removably coupled to a rotatable flywheel floorboard, a cover cylinder removably coupled to the bottom section, a top section removably coupled to the cover cylinder, and a means for controlling the enclosure. The rotatable flywheel floorboard has pivoting serrated portions for grinding excreta while the floorboard is rotating. The cover cylinder has fixed serrated portions aligned with the pivoting serrated portions for grinding excreta while said floorboard is rotating. The cover cylinder also has at least one door, and at least one shower head in fluid communication with a water supply, an upper ring, waste collection tube, and a second drive motor. The upper ring is in fluid communication with both the rotatable flywheel floorboard and the waste collection tube. The waste collection tube is in fluid communication with a sewer. The second drive motor is removably coupled to the rotatable flywheel floorboard. A means for controlling the enclosure has electric and electronic devices for periodically energizing an enclosure control system.

The animal toilet enclosure is electrically and electronically controlled, totally automated, and cleans and semi-sterilizes itself while preventing entry of an animal before it is ready for use again. It is a circular animal toilet with fixed walls and a stable rotatable flywheel floorboard for the animal to stand or squat while voiding feces or urine. As the animal leaves the toilet an entry/exit door closes automatically. A slightly slanted from the center single large rotatable flywheel floorboard with radial grooves fills approximately the entire floor of the toilet. As the rotatable flywheel floorboard begins to rotate slowly on its vertical axle, simultaneously, overhead streams of water from at least one shower head in fluid connection with a water supply begin to wash the rotatable flywheel floorboard as it rotates to and fro. The rotation becomes unidirectional and speeds up, creating a centrifugal force to assist in moving the excreta to the periphery of the rotatable flywheel floorboard where it is finely ground between the pivoting serrated portions on and near the edge of the rotatable flywheel floorboard and the fixed serrated portions adjacent toilet wall before it passes in a pulverized state downward through a tubular collecting system containing a one way gas and fluid valve in fluid connection with an outside sewer system. The tubular collecting system may be located entirely on the inside of the cylinder or partially outside of it. The tubes may be rather soft and somewhat flexible or hard and rigid; more like pipes.

DETAILED DESCRIPTION OF THE INVENTION

Figure 1:
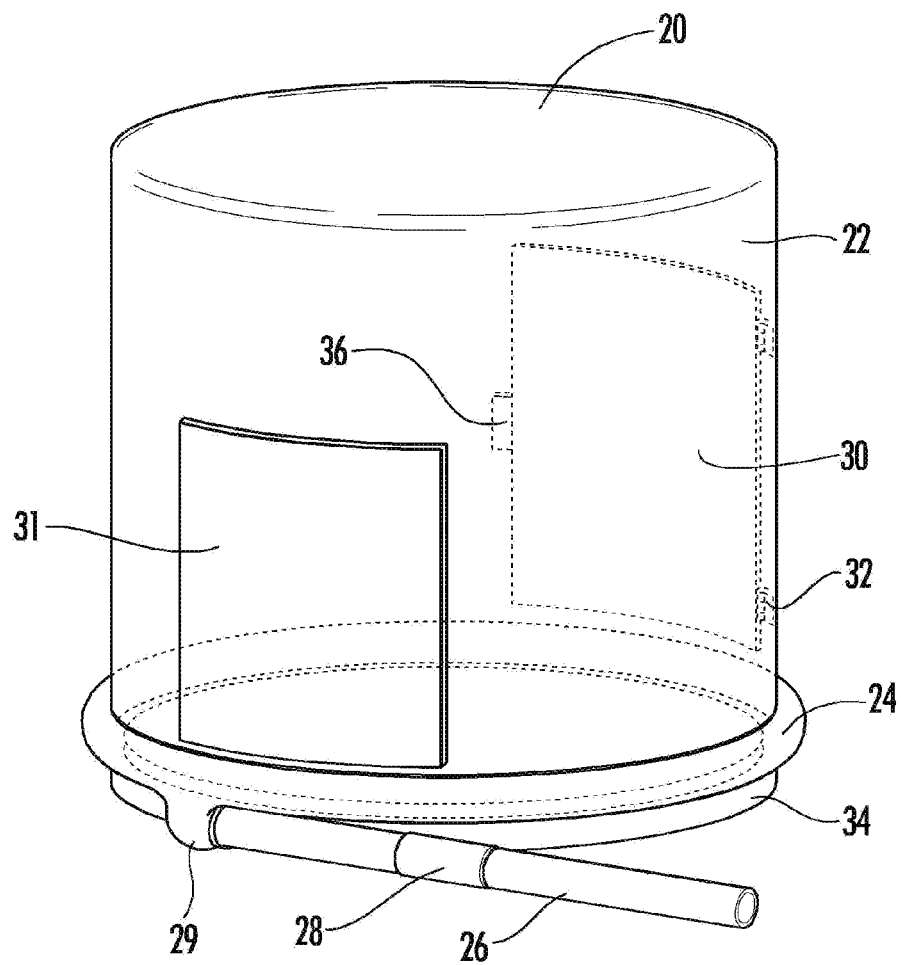
FIG. 1 is a top outside rear view of animal toilet. The excreta collecting ring is located on the outside of the cylinder. The rotatable flywheel floorboard, cover, motors, and connecting rods and electrical components are not shown.
Figure 2:
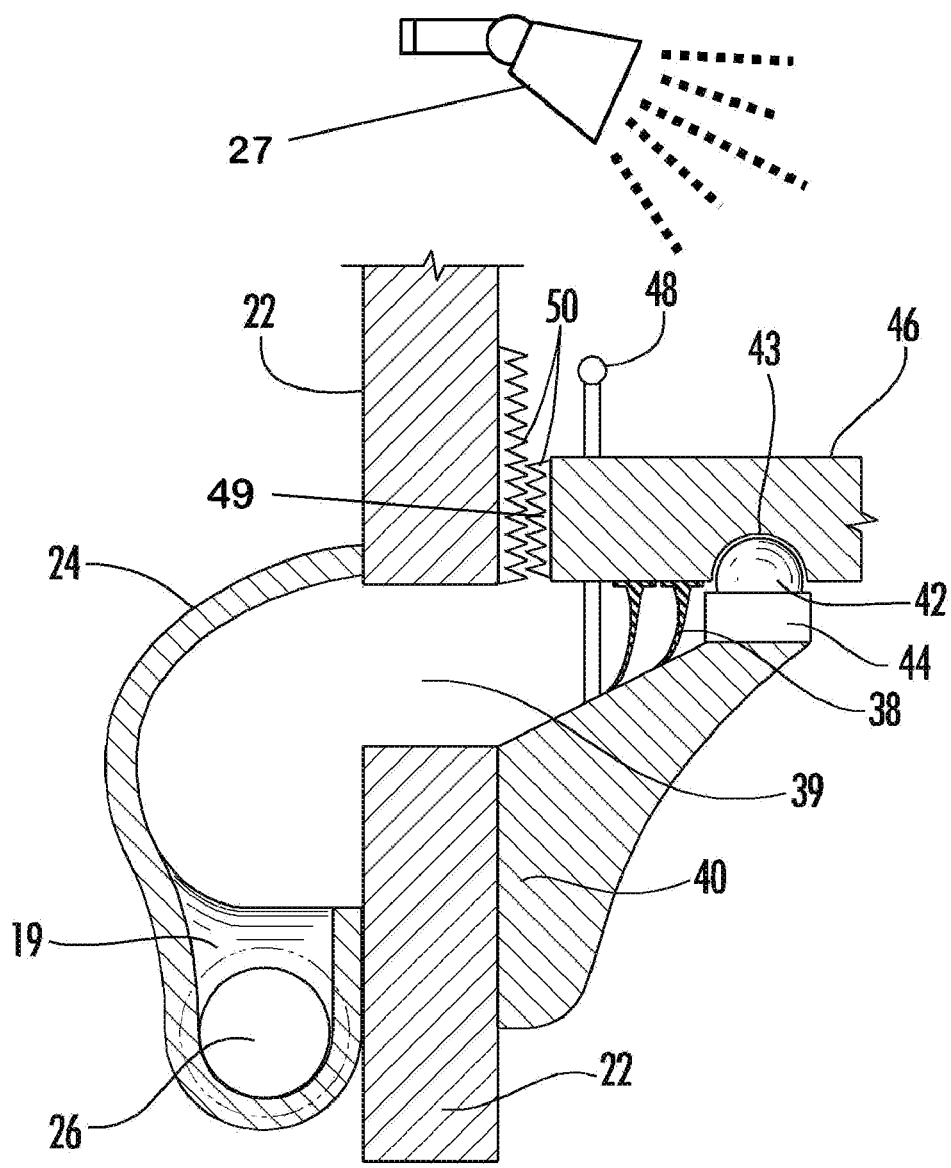
FIG. 2 is a partial side view of junction of wall and rotatable flywheel floorboard with a supporting ledge. The waste collection tube is on the outside of the wall and a ball bearing with its supporter is assisting in the support of the rotatable flywheel floorboard.
Figure 3:
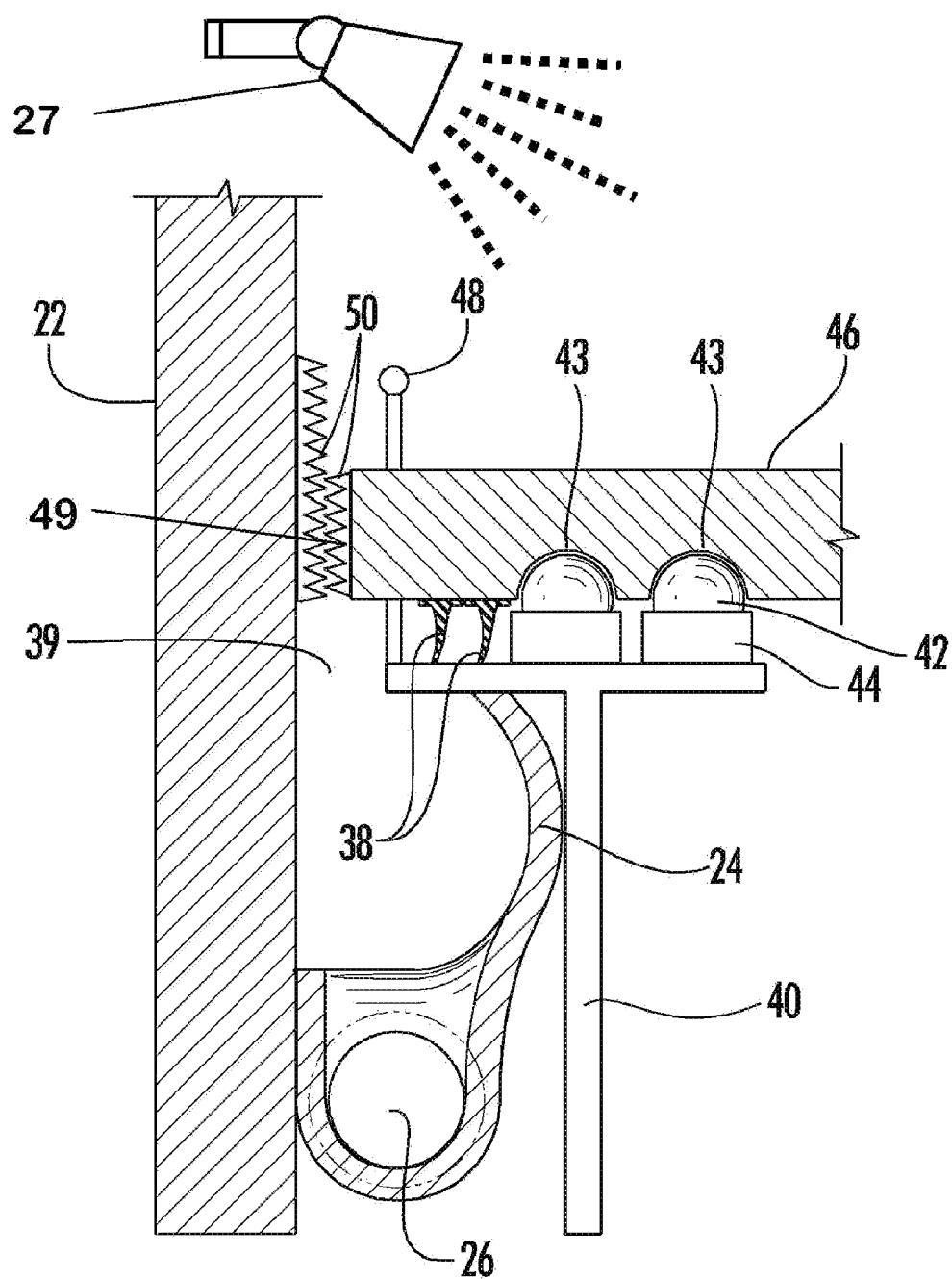
FIG. 3 is a partial horizontal view of the junction of wall and rotatable flywheel floorboard with collection tube and drain pipe to sewer on the inside of the toilet.
Figure 4:
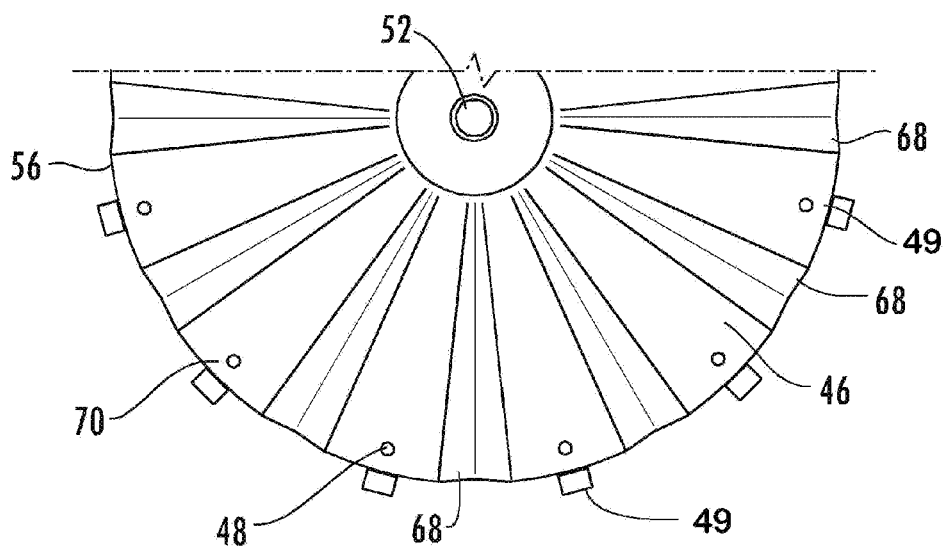
FIG. 4 is a partial top view of rotatable flywheel floorboard with grooves and attachments.
Figures 5, 6:
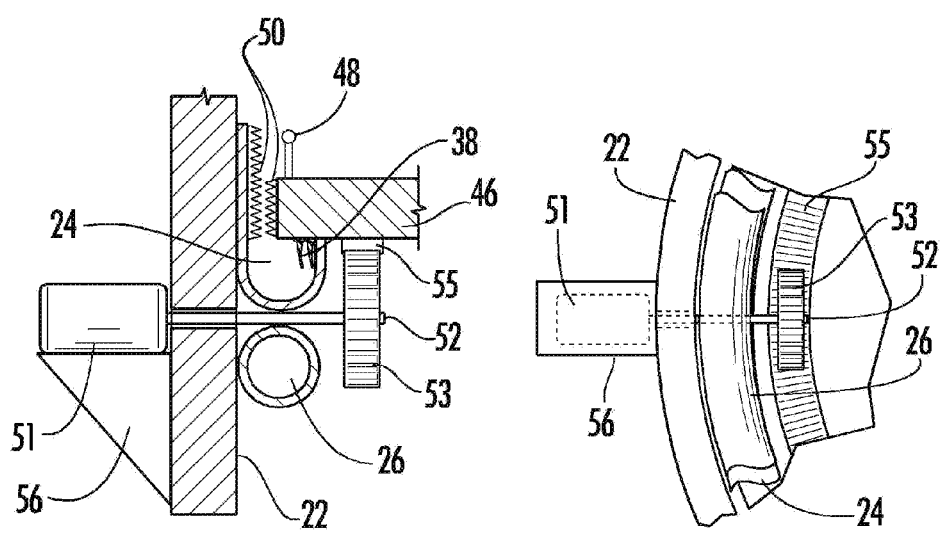
FIG. 5 is a partial side view of the junction of the wall and rotatable flywheel floorboard with motor outside of wall and connecting the rotatable flywheel floorboard's flat spur gear with it's round spur gear.
FIG. 6 is a bottom view of the junction of spur gears beneath the rotatable flywheel floorboard.

The invention in its simplest concept is a vertical free standing hollow cylinder with a large free space inside, removably coupled to a flat bottom and top, a horizontally mobile entry/exit door and a complete, stable horizontal rotatable flywheel floorboard composed of a single round board, sloping slightly from its center, that can be rotated automatically around its central axle for cleaning and grinding and stabilized automatically afterward. The concept is similar to a kitchen garbage disposal, in function.

Sufficient inside space is provided to allow the animal to walk about before and after voiding excreta. The entry/exit door is about level with the floor of the building and just above the rotatable flywheel floorboard of the toilet. The firm stable almost flat rotatable flywheel floorboard creates no insecurity in any animal.

The presence of the animal as it enters the toilet is detected by electronic sensors which turn on at least one soft overhead light. After the electronic sensors have confirmed that the animal has left the enclosure, the control system activates a preprogrammed electric component that switches on a first electric AC/DC motor to close the entry/exit door and after a slight delay activates a second AC/DC motor to begin to and fro rotation of the rotatable flywheel floorboard along with turning on overhead and wall mounted shower heads 27 to wash the excreta to the periphery of the rotatable flywheel floorboard where it is pulverized between the pivoting serrated portions on the edge of the rotatable flywheel floorboard and the proximately aligned fixed serrated portions on the toilet wall with the aid of the overhead cascading water. After the rotatable flywheel floorboard is clean and the pulverized excreta has been washed into a fluid connected sewer, and the second electric motor rotating the rotatable flywheel floorboard is turned off, ultra-violet and heat lamps located overhead are energized to semi-sterilize and dry the rotatable flywheel floorboard before the entry/exit door is opened again by the electric circuitry motor that closed it as the animal left the toilet.

The location of the second motor that rotates the rotatable flywheel floorboard can be below, above, or to the side of the rotatable flywheel floorboard; either on the inside or outside of the toilet wall. Regardless of its location the motor is removably coupled to the rotatable flywheel floorboard. The location of the circular waste collection tube and the drain pipe tube may be on the inside or the outside of the cylinder wall or partially inside and outside.

The size of the enclosure can be extremely variable dependent on the size and weight of the animals that will use it. A small feline unit can stand alone or be placed on top of a dog unit. If stacked each toilet would be operated entirely separately.

In addition to being located in a structure such as a house, an apartment, a hotel, or garage, the enclosure can also be located as a freestanding structure as in a park or yard. It must have the proper water and sewer connections regardless of its locations. It can operate on either A/C or D/C electricity, giving the added protection of uninterrupted operation in case of an electric power failure. It can also be used as temporary toilet for animals if the water inlet is connected to a proper source and the effluent is connected to a sewer or proper storage container.

All of the electronic equipment, motors, water valves and other plumbing used in the invention, are of common commercial types. The various parts of the toilet may be made of metal, wood, plastic, ceramic or vitreous or similar common materials.

The most unique components of the invention in relation to feline and canine toilets are: a) the single rotating rotatable flywheel floorboard, b) the use of the entire edge of the rotatable flywheel floorboard to pulverize the excreta, c) the use of pipes or tubes to collect and transmit the excreta and washing fluid to the sewer without using a large collecting basin or a separate grinder in the effluent line, d) the ability to put the motor outside of the toilet with the rotational connection underneath the rotatable flywheel floorboard. The simplicity of the structure and its operation, with only two small motors and basically only two moving parts without extremely high precision manufactured segments, allows for ease of manufacture and a reasonable warranty by the manufacturer.

Except for the most unique components, the invention resides in the total combination of all its parts put together in a unique manner to allow the making and claiming of a new practical animal toilet invention that can readily solve the age old problem of the rapid disposition of canine and feline voided excreta at a reasonable price.

Structural elements of the invention are labeled as follows;

20—Top section
22—Cover cylinder
24—Upper ring
26—Waste collection tube
27—Shower head
28—One-way gas and liquid valve
29—Depression in waste collection tube with liquid connection to drain tube to sewer
30—Entry/Exit door
31—Manually operated access door
32—Entry/Exit door hinge
34—Bottom section
36—Entry/Exit door latch
38—Water baffle
39—Ovoid opening in cover cylinder
40—Floor support
42—Ball bearing
44—Ball bearing support socket
46—Rotatable flywheel floorboard
48—Pin
49—Pivoting serrated portions on rotatable flywheel floorboard
50—Fixed serrated portions on cover cylinder
51—Second AC/DC motor
52—Axle of second motor
53—Round spur gears affixed to axle
55—Flat spur gear encircling the rotatable flywheel floorboard
56—Motor support to outside wall
68—Downward sloping radial drainage grooves in rotatable flywheel floorboard The invention is a free standing cylinder-shaped enclosure with its long axis in the vertical plane. It has a large free space inside, a round thin top section 20 and bottom section 34, removably coupled to cover cylinder 22, a horizontally mobile automatic entry/exit door 30, with hinges 32, and latch 36, and a work/clean access door 31, generally opposite the entry/exit door 30, a firm stable almost flat round rotatable flywheel floorboard 46 which has radial grooves 68 and slopes very slightly from the center to the periphery where several upright pins 48 are present with pivoting serrated portions 49 that almost mesh with fixed serrated portions 50 on the inside walls of the toilet. To create a pulverizing grinder of the animal excreta, the rotatable flywheel floorboard begins to slowly rotate back and forth and then becomes unidirectional as it speeds up to help push the feces to the pulverizing edge of the rotatable flywheel floorboard. As the rotatable flywheel floorboard begins to move, streams of water from at least one shower head 27 located overhead and/or on the side of the upper wall begin to wash the excreta off the rotatable flywheel floorboard and toward the rotatable flywheel floorboard's peripheral grinder along its edges. If the unit has all the excreta collecting parts located on the inside of the cylinder, two vertically stacked completely circumferential rings of tubing or piping are located near the edge of and just below the rotatable flywheel floorboard. These two rings are attached vertically to each other and laterally to the inside of the cylinder. The upper ring 24 collects and passes the waste to the waste collection tube 26 that drains to the sewer. The upper ring 24 has a cut out area of approximately 25% of its tubular circumference in the upper inner quadrant along its entire length. This produces a long J-shaped closed circular tube with its shorter side of the open loop toward the center of the toilet. The under side of the rotatable flywheel floorboard rests on the smooth polished edge of the shorter arm of the J loop all the way around the cylinder. There are several openings between the bottom of the upper ring 24 and the top of the waste collection tube 26 located at points along their common horizontal connection. A water baffle 38 is located between the underside of the rotatable flywheel floorboard and the inside of the short arm of the upper ring 24. There are at least two small depressions 29 on the underside of the waste collection tube 26, which fluid connect on the lower side to the end of at least two tubes that join to become a single tube either inside or outside of the cylinder with a one-way water and air valve 28, to prevent sewer odors and sewerage backflow into the toilet. Beyond the backflow valve this tube fluid connects to a sewer.

If a portion of the excreta collection system is located outside of the cylinder wall, there are several oval openings in the cylinder wall that fluid connect the inside of the upper ring 24 with an outside waste collection tube 26 so that the pulverized excreta and the cleaning water is transferred to the outer draining tube and thence to a one way water and gas valve and a sewer connection all outside of the cylinder wall.

A preferred embodiment contemplated for the invention is one that looks like any large appliance such as a floor model electric dishwasher. It can be connected to a 120 volt A/C standard wall electrical outlet or wired directly to this type of current. If desired, the unit can operate entirely on direct current obtained from a small 12 volt sealed D/C storage battery which is kept charged by an alternating/direct current converter connected in line with the AC/DC motor. Having the battery in line allows temporary use of the animal toilet if the regular alternating current supply should fail. The toilet waste outlet must be connected to an approved plumbing for transfer to either a regular municipal system or an ordinary operating septic tank. The toilet must be connected to a clean water supply either from a municipal system or an approved well. An air exhaust system must be available to help control unwanted odors of fecal material if the unit is to be placed in a small non-airy area.

The size of the unit depends on the space available and the size of the animals that will use it as a toilet facility. There are no specific limitations on the size of the animal toilet as it can be built to any practical size.

The toilet is a vertical hollow cover cylinder 22 with a large free space inside. It has a flat round top portion 20, and bottom portion 34, which are removably connected to the ends of the cylinder. It has two doors, both horizontally mobile: an entry-exit door 30, which operates automatically to prevent entry of an animal when the unit is soiled, and a manual door 31, for utility work and cleaning. A single round rotatable flywheel floorboard 46, is located near and parallel to the bottom. This rotatable flywheel floorboard 46, with its central axle and slightly sloping grooves 68 from the center to the periphery on its upper surface, occupies most of the horizontal area where it is located. Near and along the top periphery of the rotatable flywheel floorboard are upright pins 48, with pivoting serrated portions 49 that almost mesh with similar fixed serrated portions 50, on the adjacent wall to produce a pulverizing grinder between the entire circumference of the rotatable flywheel floorboard and the cover cylinder 22. Adjacent to and slightly beneath the entire peripheral edge of the rotatable flywheel floorboard there are two horizontal tubes or pipes, the upper ring 24, and waste collection tube 26, which are closed circles tightly attached to each other top to bottom sides in the vertical plane with several matching openings creating vertical fluid connections between them. The upper ring 24, has about 25% of its upper inner quadrant removed to create a J shaped tube or pipe. The long arm of the J tube is attached to the cylinder wall while the edge of the shorter arm which is smooth and polished serves as a support and sliding surface for the undersurface of the peripheral portion of the rotatable flywheel floorboard. The underside of the rotatable flywheel floorboard has soft plastic baffles hanging down into the inner side of the of the J tube to create a watertight junction. Several types of simple supports may be used to hold the two horizontal tubes or pipes firmly to the wall of the cylinder.

While there has been shown and described what are at present considered the preferred embodiments of the invention, it will be obvious to those skilled in the art that various changes and modifications can be made therein without departing from the scope.

I claim:

1. A circular animal toilet enclosure comprising a bottom section removably coupled to a rotatable flywheel floorboard, a cover cylinder removably coupled to said bottom section, a top section removably coupled to said cover cylinder, and a means for controlling said enclosure, wherein;

said rotatable flywheel floorboard further comprises pivoting serrated portions for grinding excreta while said floorboard is rotating;

said cover cylinder further comprises fixed serrated portions aligned with said pivoting serrated portions for grinding excreta while said floorboard is rotating, at least one shower head in fluid communication with a water supply, an upper ring, a waste collection tube, and a floorboard drive motor;

wherein said upper ring is in fluid communication with said rotatable flywheel floorboard and waste collection tube, said waste collection tube is in fluid communication with a sewer, and said floorboard drive motor is removably coupled to said rotatable flywheel floorboard; and said means for controlling said enclosure further comprising electric and electronic devices for periodically energizing an enclosure control system.

2. The enclosure of claim 1 wherein said cover cylinder further comprises at least one device selected from the group consisting of motorized entry/exit door, manual door, a light and a ultra-violet/heat lamp.

3. The enclosure of claim 1 wherein said rotatable flywheel floorboard further comprises at least one device selected from the group consisting of downward sloping radial drainage groves, upright pins, water baffles, and spur gears.

4. The enclosure of claim 1 wherein said means for controlling said enclosure further comprises at least one device selected from the group consisting of electronic motion sensor, water valve, A/C power supply, and D/C power supply.

5. The enclosure of claim 1 wherein said enclosure is constructed from at least one material selected from the group consisting of metal, wood, plastic, ceramic, and vitreous materials.

6. The enclosure of claim 1 wherein said waste collection tube further comprises a one-way gas and liquid valve.

* * * * *